US005493450A

United States Patent [19]
Ekstrand

[11] Patent Number: 5,493,450
[45] Date of Patent: Feb. 20, 1996

[54] SIGHTING INSTRUMENT

[76] Inventor: Arne Ekstrand, 1107 E. Silver Springs Blvd., S.5, Ocala, Fla. 32670

[21] Appl. No.: 154,690

[22] Filed: Nov. 18, 1993

[51] Int. Cl.⁶ .......................... G02B 27/02; G01C 9/02; F41G 1/38; F41C 3/14
[52] U.S. Cl. .................. 359/799; 359/798; 356/247; 356/251; 42/100; 42/103; 33/233; 33/245; 33/247; 89/41.19
[58] Field of Search .................. 359/798, 799, 359/800, 801, 385, 389, 390, 391, 394, 428, 429, 430; 356/251, 247; 362/253, 257, 268, 311; 42/100, 103, 104; 33/233, 241, 245, 247; 89/41.19

[56] References Cited

U.S. PATENT DOCUMENTS

| | | | |
|---|---|---|---|
| 3,678,590 | 7/1972 | Hayward | 33/241 |
| 4,245,284 | 1/1981 | Moore | 362/311 |
| 4,764,011 | 8/1988 | Goldstein | 356/251 |
| 4,859,058 | 8/1989 | Estrand | 356/251 |
| 4,940,324 | 7/1990 | Nichols | 356/247 |
| 4,941,277 | 7/1990 | Lawlor | 42/100 |
| 5,016,382 | 5/1991 | Pickle | 42/100 |

*Primary Examiner*—Georgia Y. Epps
*Assistant Examiner*—Ricky Mack
*Attorney, Agent, or Firm*—Warren L. Franz; James H. Beusse

[57] ABSTRACT

An electronic light dot reticle sight (10) for a firearm has a concave surface lens (22) in a tubular lens housing (11) and an external LED (25) connected via a fiber optic (26) to generate a light point image viewable ahead of the concave surface. A tubular circuitry housing (32) joins lens housing (11) at right angles and has a light adjustment knob (58) which turns a printed circuit disk (42) against a contact (54) on an internal shoulder (39) to select a resistor connection (38, 46) to a spring-loaded common battery contact (49). A spring-loaded pin (73), passing through a recoil bar (70) having an arcuate projection (93) that fits within an arcuate recess (94), provides a shock-resistant connection between lens housing (11) and the firearm. Adjustment screws (31, 94) act at one end of bar (70) to set windage and elevation about the pivot.

18 Claims, 3 Drawing Sheets

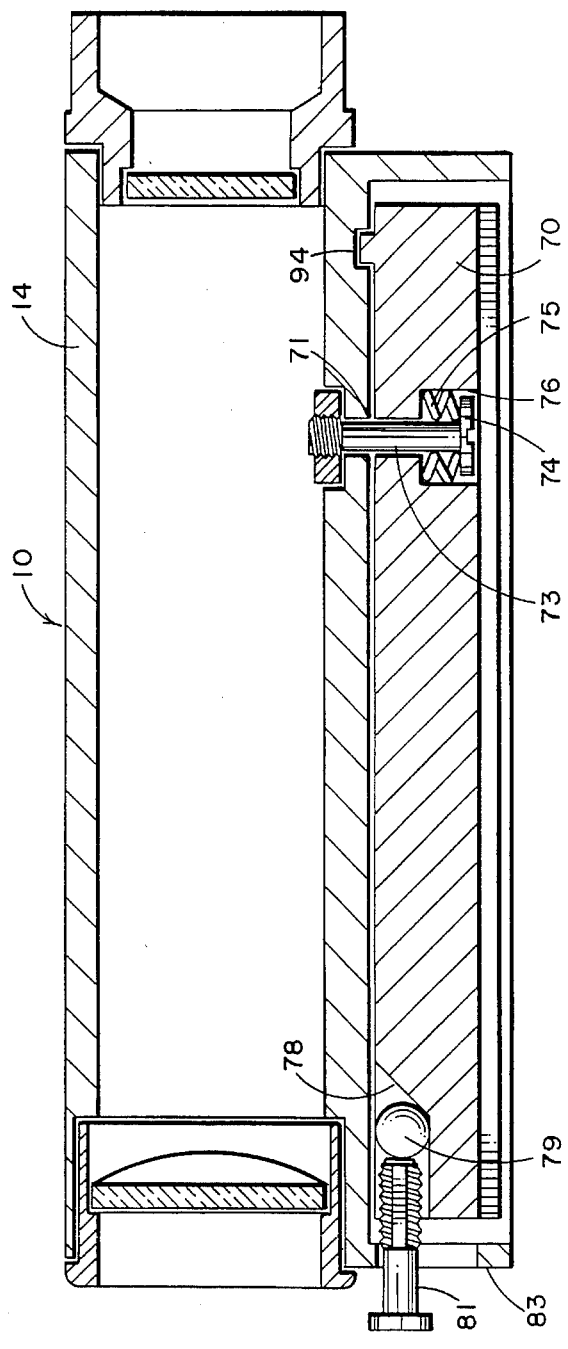
FIG. 2
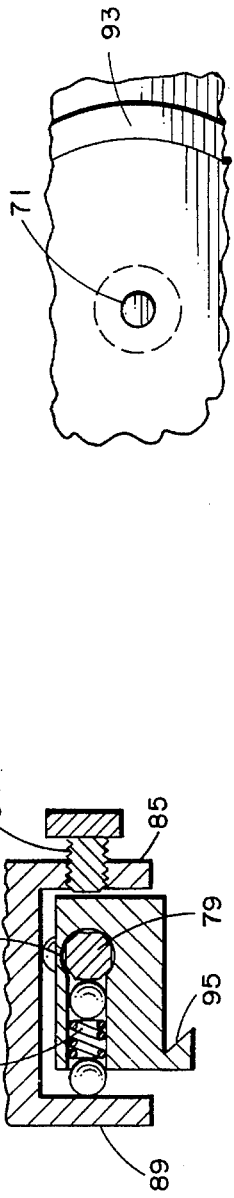
FIG. 4
FIG. 3

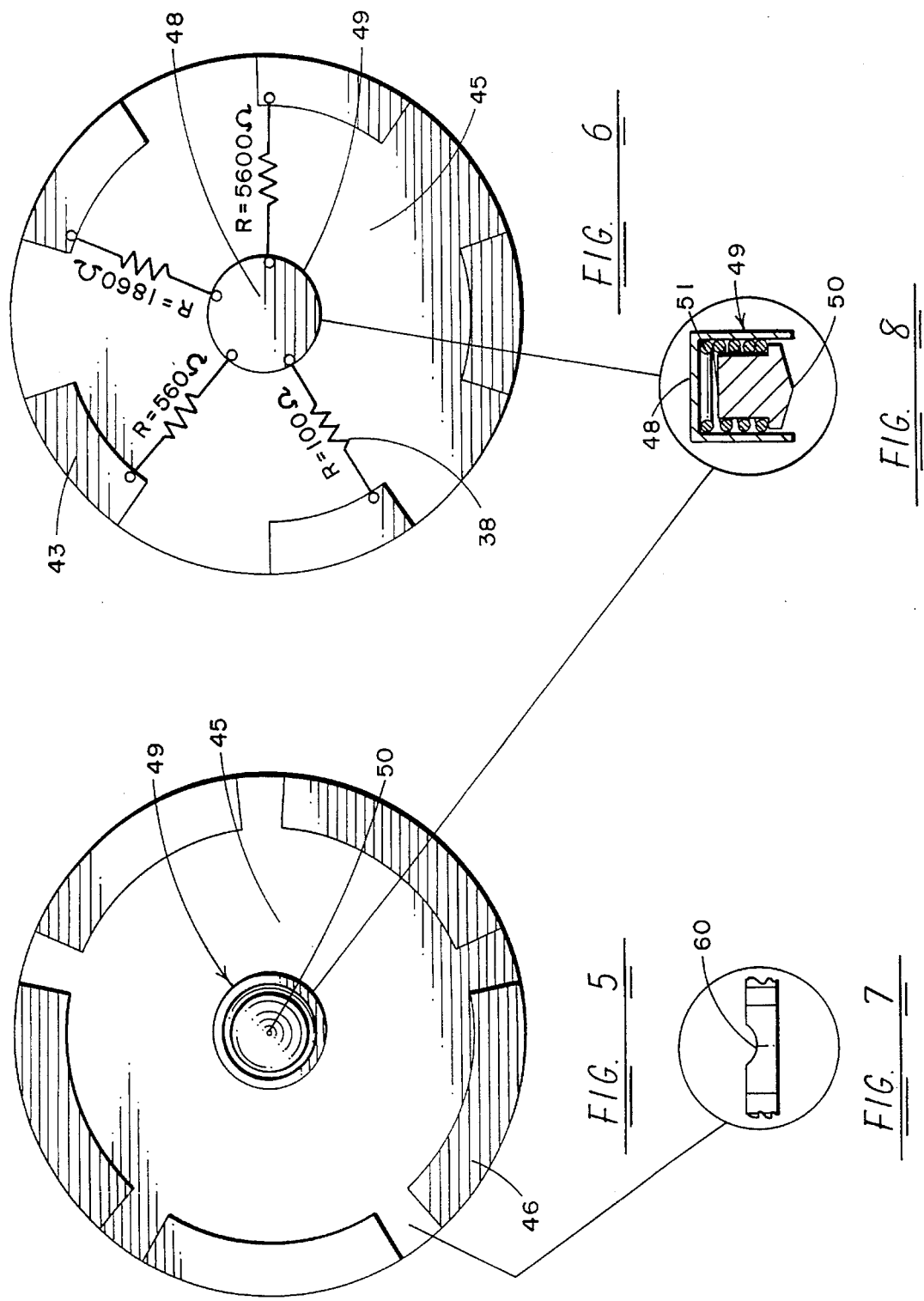

SIGHTING INSTRUMENT

IMPROVEMENTS IN SIGHTING INSTRUMENT

This invention relates generally to optical sighting instruments and, in particular, to improvements in adjustable electronic optical sighting devices usable by action shooters and hunters for aiming light firearms.

BACKGROUND OF THE INVENTION

An example of a sighting instrument of the type to which the present invention relates is described in U.S. Pat. No. 4,859,058, the disclosure of which is incorporated herein by reference thereto.

Such a device comprises an electronic light dot reticle sight of relatively simple, lightweight construction that enables rapid and precise aiming of a firearm, even under low light conditions. A conventional implementation is of a double-barreled side-by-side construction, with a tubular battery or circuitry housing supported by a brace or strut in spaced position adjacent a firearm mountable tubular lens housing.

The lens housing has front and rear apertures and contains a lens system having a rearwardly facing concave light reflecting surface that serves as a semi-transparent mirror to produce an image of a small electric light source. The semi-transparent mirror surface and the light source are arranged so that a dot point image will be perceived ahead of the mirror surface by an observer looking through the sight, to act as a sighting mark between the observer's eye and the target. The lens system is mounted in a tube resiliently supported for variation in orientation by means of vertical and horizontal positioning screws that contact the tube to provide elevation and cross-angle or windage adjustment control for the sight by positioning the dot point image relative to the lens housing axis. The adjustment screws are marked in minute-of-angle increments, are coin turnable, and are shielded by protective dust covers.

In the conventional configuration shown in U.S. Pat. No. 4,859,058, the battery or circuitry housing has a removable cover at one end for replacement of two mercury cells that power the light source located in the lens housing. An on/off switch and intensity control for the light (and thus the dot image sighting mark) are provided at the other end of the battery housing in the form of a rotation knob rheostat. The lens housing is provided with strap brackets for mounting on a firearm, and the battery housing is joined in spaced position alongside the lens housing by a radially-directed supporting brace or strut. Electrical connection between the rheostat and power source in the battery housing and the light in the lens housing is established by wires running through the brace.

In the typical conventional configuration, the battery housing is located to the left or right of and slightly below the lens housing, so that its rheostat post and power cells are coaxially aligned in general parallel relationship to the optical axis, and thus the gun axis. The cells are loaded in the housing and acted upon by a spring which provides a stabilizing bias in the presences of firing forces to maintain the position of the cells.

Guns such as air guns have a "forward" recoil, due to the spring hitting the bottom of the air cylinder. Other guns have a backward recoil due to the firing of the projectile.

SUMMARY OF THE INVENTION

The present invention provides an electronic sighting instrument having improved shock resistant construction that provides improved protection to the battery and optical elements.

The invention also provides a sighting instrument of the type described, having improved light dot reticle and power source circuitry.

In one aspect of the invention, a sighting instrument having a tubular lens containing a light source and a lens having a rearwardly-facing concave reflecting surface for generating a light point image of the light source to serve as a sighting mark, has an improved shock resistant housing and fiber optics dot placement means.

BRIEF DESCRIPTION OF THE DRAWINGS

Embodiments of the invention have been chosen for purposes of illustration and description, and are shown in the accompanying drawings, wherein:

FIG. 2 is a vertical longitudinal section view of the same sight, taken along the line 2—2 of FIG. 1;

FIG. 3 is a fragmentary vertical lateral section view taken along the line 3—3 of FIG. 1;

FIG. 4 is a fragmentary top plan view of the recoil bar element of FIG. 2;

FIGS. 5 and 6 are top and bottom plan views of the battery contact circuitry element of FIG. 1; and FIGS. 7 and 8 are enlarged detail views of positions of the element of FIGS. 5 and 6.

Throughout the drawings, like elements are referred to by like numerals.

DESCRIPTION OF THE PREFERRED EMBODIMENTS

Figure 1:
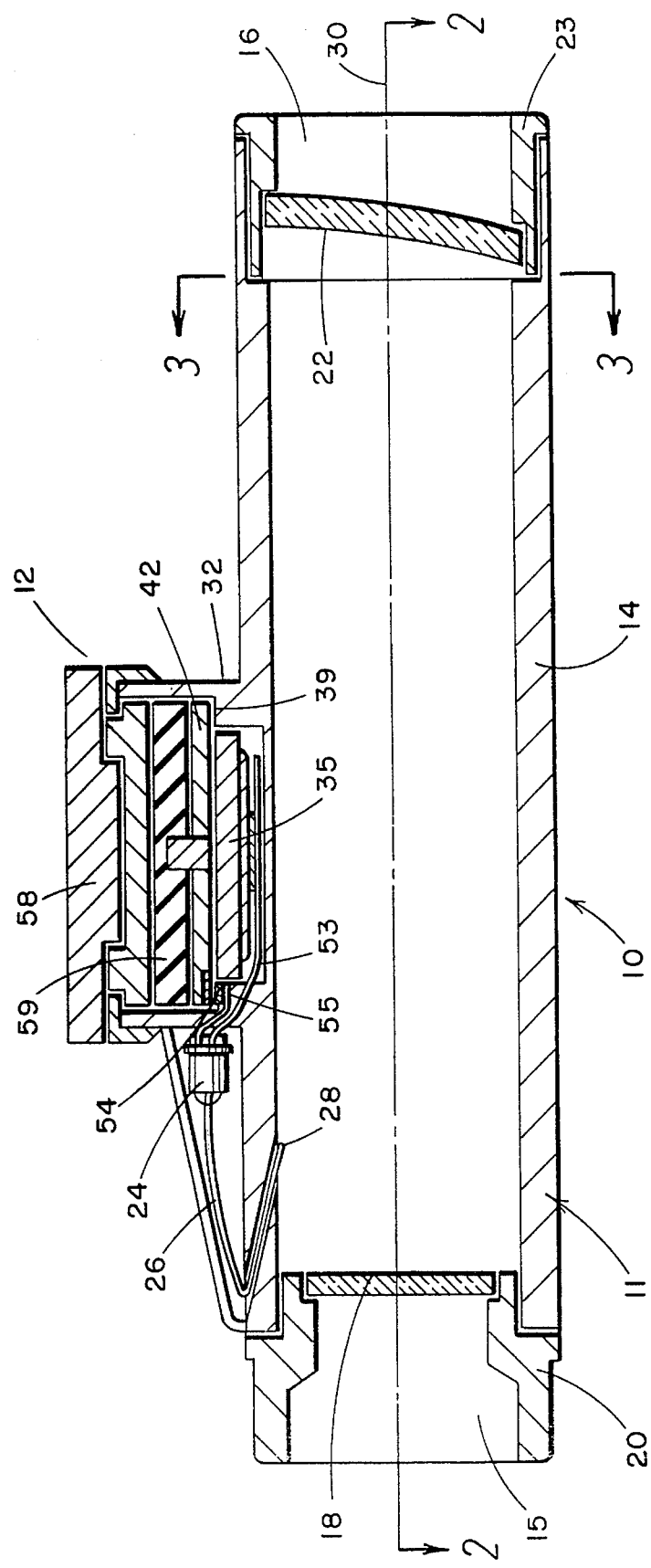
FIG. 1 is a horizontal longitudinal section view of a sighting instrument according to the principles of the invention.

FIGS. 1–2 illustrate an exemplary optical sighting instrument 10 having an optical device or lens member 11 joined by an electronic device or circuitry member 12. The structure 11 takes the place of the corresponding optical device or lens member disclosed in U.S. Pat. No. 4,859,058; the circuitry member 12 takes the place of the corresponding circuitry member of the '058 patent. In contrast to the corresponding members 11 and 12 of the '058 patent which are both elongated structures positioned with their longitudinal axes substantially in parallel, the lens member 11 is a simplified version of the corresponding member 11 in the '058 patent, and the circuitry member 12 of the depicted embodiment 10 is a much more compact arrangement having an axis disposed at right angles to the lens axis.

The lens member 11 comprises a single tubular housing 14 having rear and front sight apertures 15, 16. The rear end 15 of housing 14 is covered by a protective glass 18 which is held in place by a rear protective glass holder 20 coaxially threaded into the tube. A lens element 22, held in place by a similar lens holder 23 at the front of the tube, serves both to close the front aperture and to provide a concave light reflecting surface that establishes a semi-transparent mirror facing the rear sight aperture 15. A small electronic light source constituted by a light emitting diode (LED) 24, is secured externally of the tube in shielded position adjacent the circuitry member 12. A length of light transmitting optical fiber 26 communicates light from LED 24 through the housing wall to a point at the rear end of the lens system at a position adjacent the inner periphery of the rear end 15. The concave surface 22 and light output tip 28 of the fiber 26 are relatively positioned and oriented so that light emitted from the light source 24 and directed through the fiber 26 to the semi-transparent mirror 22 will be reflected backwardly to generate, similar to the '058 lens system operation, a virtual image of the light emission point 28 that will appear to an observer looking through the aperture 16 from the rear to the front of the sight 10, as a light dot sighting mark located between the observer's eye and the target at a point ahead of the surface 22 along the longitudinal axis 30 of the tubular housing 14.

The electronic circuitry member 12 comprises a tubular housing 32 within which is received an electric power source, such as a circular lithium disk-like cell 35, connected to power the light source 24. An on/off switch and intensity control for the light source 24 (and thus the dot point sighting mark 28) is provided by voltage control means, such as an array of discreet resistor components 38 (FIGS. 6), described further below.

The tubular housing 32 has an open side end and a reduced diameter inner portion forming an internal circumferential shoulder 39. A circular contact plate or disk 42 in the form of a double-sided printed circuit (shown in FIGS. 5 and 6) has isolated upper surface contacts 43 electrically connected through an insulated substrate 45 to corresponding lower surface contacts 46 projecting downwardly at spaced locations from the lower surface of the substrate 45. Resistors 38 are respectively connected between the contacts 43 and the top 48 (FIGS. 6 and 8) of a spring-loaded contact member 49. Member 49 houses a tapered conductive element 50 which is biased by means of a spring 51, to establish contact between the member 49 and one side of battery cell 35. The other side of cell 35 is connected by means of a conductor 53 to one terminal of LED 24. The diameter of the disk 42 is slightly larger than the internal diameter of the inside of housing 12 so that the disk 42 can be received as shown in FIG. 1 with its lower margin in position against the shoulder 39 and one of the contacts 46 in alignment with a contact 54 fixed on shoulder 39 and connected via a conductor 55 to the other terminal of LED 24. A light adjustment knob 58 is rotatively secured over the open end of housing 12, and a circular pad 59 is compressed between the upper surface of circuit 42 and the inner surface of knob 58. This provides a frictional motion coupling through pad 59 that enables the circuit 42 to be rotated coaxially with knob 58 to bring a selected one of the angularly-spaced contacts 46 into electrical communication with the fixed contact 54, thereby selecting which of resistors 38 will be connected into the light circuit. The islands insulating one contact 46 from another are preferably provided with depressions 60 (FIG. 7) into which one or more outwardly protruding dogs on shoulder 39 can be matched to provide distinguishable "click" stops as knob 58 is rotated. The housing 32 may be provided externally with designations corresponding to each "click" stop so that the knob 58 can be turned clockwise or counterclockwise to align a resistor setting index with a cursor mark, to go from an offsetting through designated LED brightness settings.

As shown in FIGS. 2–4, a recoil bar 70 having a generally rectangular cross-section is located below and in longitudinal alignment with the housing tube 14. Bar 70 includes a vertical aperture 71 located a spaced distance from a rear of bar 70. A pin 73 passes through the aperture and threads into the bottom of tube 14. The top of pin 73 includes an enlarged head 74 which is biased downwardly by the action of a spring 75 that acts between the inside of counterbore 76 of aperture 71 and the inner surface of head 74. The front of bar 70 includes an upwardly and rearwardly directed tapered surface 78 against which a rolling member 79 is urged by means of a screw 81 which is threaded through the wall of a flange 83 directed downwardly at the front of tube 14. Another screw 84 (FIG. 3), threaded through a longitudinally extended flange 85 directed downwardly at the side of tube 14, urges rolling member 79 against the bias of a spring 87 that acts between member 79 and an opposite longitudinally extending, downwardly directed flange 89. Member 79 is constrained within a channel 91 so that inward or outward movement of a tip of screw 84 will cause rotation of bar 70 in a horizontal plane, for windage adjustment of tube 10, about a rotational axis provided by pin 73. Surface 78 is configured and adapted so that movement of a tip of screw 81 against member 79 will cause rotation of bar 70 in a vertical plane, for elevational adjustment of tube 10, about a rotational axis established at the underside of the rear of tube 14. A raised arcuate projection 93 (FIG. 4), rearward of bore 73 on bar 70, fits into a complementary arcuate recess 94 on the underside adjacent the rear of tube 14. This provides a recoil absorbing coupling between the bar 20 and the tube 14. The underside of bar 70 includes a longitudinally extending wedge-shaped depending portion 95 (FIG. 3) that fits onto a corresponding mounting assembly of a firearm to lock the bar 70 in longitudinal alignment with a projectile firing barrel.

Those skilled in the art to which the invention relates will appreciate that other substitutions and modifications can be made to the described embodiment, without departing from the spirit and scope of the invention as described by the claims below.

What is claimed is:

1. An optical sighting instrument, comprising:

a tubular lens housing having front and rear apertures;

a lens mounted within said lens housing and having a concave light reflecting surface facing said rear aperture;

a light source located outside said lens housing;

a light transmitting optical fiber having one end located at said light source and another end located within said lens housing and relative to said concave surface so as to generate a light point image viewable as a sighting mark at a point ahead of said surface by an observer looking through the sighting device from said rear to said front aperture;

a circuitry housing attached to said lens housing;

means, located within said circuitry housing, for connecting a power source received within said circuitry housing to illuminate said light source; and means, connected to said lens housing, for mounting said lens housing to a firearm; said means for mounting comprising an elongated recoil bar positioned in transverse alignment with said lens housing axis, and shock resistant means connecting said recoil bar to said lens housing.

2. An instrument as in claim 1, wherein said tubular lens housing has a longitudinal axis; and wherein said circuitry housing is a tubular circuitry housing having a longitudinal axis disposed at right angles to said tubular lens housing axis.

3. An instrument as in claim 1, wherein said circuitry housing has an open end and includes a contact plate located within said circuitry housing; and wherein said instrument further comprises means, including an adjustment knob rotatively secured over said open end, for selectively varying intensity of illumination of said light source.

4. An instrument as in claim 3, wherein said contact plate comprises an insulated substrate with first and second surfaces, a plurality of isolated contacts located on said first surface, a common contact member, and a plurality of different valued resistors respectively electrically connecting said isolated contacts to said common contact member; and wherein said means for varying intensity comprises means connecting said common contact to one of said light source and a power source; and means, responsive to rotation of said knob, connecting a selected one of said isolated contacts to the other of said light source and a power source.

5. An instrument as in claim 4, wherein said means for connecting said common contact comprises a spring-loaded contact member interposed between said common contact and a power source.

6. An instrument as in claim 5, wherein said spring-loaded contact member comprises a tapered conductive element, and a spring for biasing said tapered element into contact with one side of a battery cell.

7. An instrument as in claim 5, wherein said means connecting a selected one of said isolated contacts comprises a plurality of contacts located on said second surface and respectively connected through said substrate to said plurality of contacts located on said first surface, and means for rotating said contact plate together with said rotating knob for establishing contact between the other of said light source and power source and a selected one of said contacts on said second surface.

8. An instrument as in claim 1, wherein said circuitry housing is a tubular housing having an open end and a reduced diameter inner portion forming an internal circumferential shoulder; wherein said means for connecting a power source comprises a circular contact plate located against said shoulder and having a substrate with upper and lower surfaces, a plurality of isolated contacts located on said upper surface, a corresponding plurality of contacts projecting downwardly at spaced locations from said lower surface and being respectively electrically connected through said substrate with said upper surface contacts, a first common contact member, and a plurality of different valued resistors respectively connected between said upper surface contacts and said first common contact member; said plate having a diameter larger than said reduced diameter and being located with a marginal portion of said lower surface resting against said shoulder; and said means for connecting a power source further comprises a conductive element and a spring biasing said conductive element to establish contact between said first common contact member and one side of a battery cell; means connecting the other side of said cell to a terminal of said light source; a second common contact member fixed on said shoulder; and an adjustment knob rotatively secured over said circuitry housing open end and cooperatively associated with said plate so that rotation of said knob will cause rotation of said plate to bring a selected one of said lower surface contacts into electrical communication with said second common contact member, thereby selecting one of said resistors to be active in illuminating said light source.

9. An instrument as in claim 8, wherein said lower surface contacts are spaced from another by portions of substrate provided with detents, and said shoulder is provided with one or more dogs which act with said detents to provide "click" stops as said knob is rotated.

10. An instrument as in claim 9, wherein said circuitry housing is provided with indicia to indicate light levels associated with knob rotational positions corresponding to said "click" stops.

11. An instrument as in claim 10, wherein said knob has an inner surface, and said instrument further comprises a pad compressed between said upper surface of said plate and said inner surface of said knob to provide a frictional motion coupling means for rotating said plate with said knob to bring a selected one of said lower surface contacts into electrical communication with said second common contact member.

12. An instrument as in claim 1, wherein said means connecting said bar includes means connecting said bar about a pivot to said lens housing.

13. An instrument as in claim 12, wherein said bar further includes an arcuate projection and said lens housing includes a complementary arcuate recess receiving said projection for guiding movement of said bar relative to said lens housing about said pivot.

14. An instrument as in claim 13, further comprising means, attached to one of said lens housing and bar and acting against the other of said lens housing and bar, for setting the vertical and horizontal angular positions of said bar relative to said lens housing, about said pivot.

15. An instrument as in claim 14, wherein said means connecting said bar to said lens housing comprises said bar having a vertical aperture located a spaced distance from a rear of said bar, a pin having an end attached to said tube and another end, and spring biasing means acting between said another end and said rod.

16. An instrument as in claim 15, wherein said means for setting the angular positions comprises laterally spaced longitudinal flanges and longitudinally spaced lateral flanges depending from said lens housing, a longitudinally adjustable member connecting one of said lateral flanges and said rod, and a laterally adjustable member connecting one of said longitudinal flanges and said rod.

17. An instrument as in claim 16, wherein said bar includes a front having an upwardly and rearwardly directed tapered surface, a rolling member on said surface, said longitudinally adjustable member comprises a first screw threaded through said one lateral flange into contact with said rolling member, said laterally adjustable member comprises a second screw threaded through said one longitudinal flange into contact with said rolling member, and said means for setting further comprises spring means, acting between said other of said longitudinal flanges and said rod or rolling member, for biasing said rod toward said one longitudinal flange.

18. An optical sighting instrument, comprising:
 a tubular lens housing having front and rear apertures and a longitudinal axis;
 a lens mounted within said lens housing and having a concave light reflecting surface facing said rear aperture;
 a light source located on said instrument and relative to said concave surface so as to generate a light point image viewable as a sighting mark at a point ahead of said surface by an observer looking through the sighting device from said rear to said front aperture;
 a circuitry located on said instrument, for connecting a power source to illuminate said light source; and
 means, connected to said lens housing, for mounting said lens housing to a firearm;
 said means for mounting comprising an elongated recoil bar positioned in longitudinal alignment with said lens housing axis, and shock resistant means connecting said bar about a pivot to said lens housing; said shock resistant means comprising said bar including an arcdate projection, said lens housing including a complementary arcuate recess receiving said projection, and means, attached to one of said lens housing and bar and acting against the other of said lens housing and bar, for setting vertical and horizontal angular positions of said rod relative to said lens housing, about said pivot.

* * * * *